United States Patent
Muhe-Sturm et al.

(10) Patent No.: US 9,637,045 B2
(45) Date of Patent: May 2, 2017

(54) EDGE PROFILE FOR BORDERING A SUPERSTRUCTURE OF A RESCUE VEHICLE, IN PARTICULAR A FIRE FIGHTING VEHICLE

(71) Applicant: Iveco Magirus AG, Ulm (DE)

(72) Inventors: Frank Muhe-Sturm, Neu-Ulm (DE); Jens Kraemer, Ulm/Donau (DE)

(73) Assignee: Iveco Magirus AG, Ulm (DE)

( * ) Notice: Subject to any disclaimer, the term of this patent is extended or adjusted under 35 U.S.C. 154(b) by 0 days.

(21) Appl. No.: 14/225,214

(22) Filed: Mar. 25, 2014

(65) Prior Publication Data

US 2014/0293640 A1     Oct. 2, 2014

(30) Foreign Application Priority Data

Mar. 27, 2013   (EP) .................................... 13161368

(51) Int. Cl.

| | |
|---|---|
| *B60Q 3/04* | (2006.01) |
| *F21S 8/10* | (2006.01) |
| *F21V 11/00* | (2015.01) |
| *F21V 21/00* | (2006.01) |
| *F21V 29/00* | (2015.01) |
| *B60Q 1/00* | (2006.01) |

(Continued)

(52) U.S. Cl.
CPC ............. *B60Q 1/0035* (2013.01); *B60Q 1/24* (2013.01); *B60Q 1/2611* (2013.01); *B60Q 1/2615* (2013.01); *B60Q 1/32* (2013.01); *B62D 33/046* (2013.01); *A62C 27/00* (2013.01)

(58) Field of Classification Search
CPC .... B60Q 1/2619; B60Q 1/2623; B60Q 1/236; B60Q 1/2638; B60Q 1/2661; B60Q 1/0035; B60Q 1/2611; B60Q 1/2615; B60Q 1/32; B62D 33/046
USPC ......................................................... 362/543
See application file for complete search history.

(56) References Cited

U.S. PATENT DOCUMENTS 4,557,494 A * 12/1985 Elwell ........................... 362/495
5,918,962 A *  7/1999 Nagano ......................... 362/146
(Continued)

FOREIGN PATENT DOCUMENTS

EP          0541485           5/1993

OTHER PUBLICATIONS

Machine translation of Roellin, Ulrich; EP0541485 (A1), Published May 12, 1993.*

*Primary Examiner* — Peggy Neils
*Assistant Examiner* — William N Harris
(74) *Attorney, Agent, or Firm* — Stetina Brunda Garred and Brucker

(57) ABSTRACT

An edge profile for bordering the superstructure of a rescue vehicle is contemplated, specifically an edge profile for bordering the upper walking deck of a firefighting vehicle that provide a modular construction system with enhanced security features. The edge profile is an extruded hollow body having a cross section with a front wall portion and an upper and lower groove for simultaneously illuminating the border of the upper walking deck and the environment around the base of the vehicle. The edge profile modularly engages with the vehicle body via cross-sectional horizontal and vertical mounting grooves, which do not require welding. A lower flange portion is further provided to cover upper parts of storage compartments at the sides of the vehicle, especially roller shutters.

10 Claims, 2 Drawing Sheets

(51) Int. Cl.
*B60Q 1/24* (2006.01)
*B60Q 1/26* (2006.01)
*B60Q 1/32* (2006.01)
*B62D 33/04* (2006.01)
A62C 27/00 (2006.01)

(56) References Cited

U.S. PATENT DOCUMENTS

| | | | |
|---|---|---|---|
| 6,076,936 A * | 6/2000 | George | 362/146 |
| RE37,113 E * | 3/2001 | Shimada | 362/146 |
| 6,554,446 B1 * | 4/2003 | Walsh et al. | 362/146 |
| 2012/0320616 A1 * | 12/2012 | Ronacher et al. | 362/516 |

* cited by examiner

EDGE PROFILE FOR BORDERING A SUPERSTRUCTURE OF A RESCUE VEHICLE, IN PARTICULAR A FIRE FIGHTING VEHICLE

CROSS REFERENCE TO RELATED APPLICATIONS

The present application claims priority to European Patent Application No. 13161368.9 filed Mar. 27, 2013.

STATEMENT RE: FEDERALLY SPONSORED RESEARCH/DEVELOPMENT

Not Applicable.

BACKGROUND OF THE INVENTION

The present invention relates to an edge profile for bordering the superstructure rescue vehicle, in particular a fire fighting vehicle.
Many aerial vehicles, especially fire fighting vehicles that are equipped with a turnable and extractable ladder, comprise a walking deck that can be entered by an operator to access the main operator seat at the turret of the ladder. In a very common construction the deck area is formed by an aluminum metal sheet with an anti-slip surface, which is bended and welded to the top of the vehicle body at its edges.

It has been envisaged to form the superstructure of such a vehicle as a modular system of extruded aluminum profiles. Such a system provides many benefits under the aspects of cost reduction and flexibility. However, until now there is no way how to combine the advantages of such a modular superstructure with a deck area formed by bended and welded metal sheets, as explained above. Moreover, it is desired to provide the superstructure of the vehicle with additional security features, especially related to an illumination of the deck, its borders and its environment so that the deck can be entered securely even in situations with poor visibility. Generally there is the desire for a bordering construction of the superstructure, especially for the deck of a rescue vehicle that fulfills all these requirements.

SUMMARY OF THE INVENTION

It is therefore an object of the present invention to provide an edge profile for bordering a superstructure of a rescue vehicle, in particular a fire fighting vehicle, that fulfills all requirements of providing a simple and secure connection, especially within a modular construction system, for bordering of the top deck portion of the vehicle and the lateral side wall portion. It is another object to incorporate security features into this profile for visualizing the borders of the deck portion and illuminating the environment of the vehicle.

These objects are achieved by an edge profile comprising the features of claim 1.

The edge profile according to the present invention comprises an extruded profile body with a cross section that comprises a central hollow portion and a first groove opening towards the upper side of the profile body in which a first band-shaped lighting device is arranged, a second groove opening laterally towards the bottom side of the profile body in which a second band-shaped lighting device is arranged, a first cross section portion for engaging with a fixing means for fixing the edge profile to the vehicle body, said first cross section portion being arranged at a back portion of the profile body that faces the vehicle body, a flat upper support portion on top of the first cross section portion for supporting a top plate of the superstructure, and a plate-shaped flange portion extending vertically at the bottom of the profile body.

This edge profile according to the present invention combines a number of different functions. First of all, the first band-shaped lighting device serves to illuminate the border of the top plate of the superstructure, i. e. the deck at the top of the vehicle. The edge of this deck is supported by the flat upper support portion. Because the top plate is completely enclosed and supported by the edge profile, no welding is necessary at the edges, and it is possible to combine a top plate of a different material with the present edge profile. The environment of the vehicle is illuminated by the second band-shaped lighting device that radiates light in a lateral downward direction to illuminate a ground around the vehicle. The first cross section portion forms an engaging and fixing portion of the profile to engage with a fixing means of the vehicle body that can be inserted into the first cross section portion. Finally the plate shaped flange portion serves to cover the upper part of a storage compartment at the side of the vehicle, especially to cover a roller shutter. Moreover, this flange portion can carry a visual marking that extends around the top of the vehicle.

According to one preferred embodiment of the present invention, at least one of the first and second band-shaped lighting devices is a lighting bar that is fixed within the respective first or second groove. Such a lighting bar can be made of a transparent or translucent plastic material housing a number of small light sources, for example, LEDs. Each lighting bar can be fixed in its respective groove by any suitable means, also including the option that the lighting bar is simply fixed into the groove by a snap-fit action.

More preferably the first cross section portion for engaging with a fixing means comprises a third groove opening towards the back side of the profile body. This third groove can accommodate a corresponding tongue or other protrusion fixed to the vehicle body.

According to another preferred embodiment of the present invention, the cross section of the extruded profile body further comprises a second cross section portion for engaging with a fixing means for fixing the edge profile to the vehicle body, said second cross section portion comprising a fourth groove opening towards the bottom side of the profile body and being arranged below the first cross section portion at the back portion of the profile body. This second cross section portion provides other options to fix the edge profile to the vehicle body.

BRIEF DESCRIPTION OF THE DRAWINGS

These and other aspects of the invention will be apparent from and elucidated with reference to the embodiment described hereinafter.

DETAILED DESCRIPTION OF THE INVENTION

Figure 1:
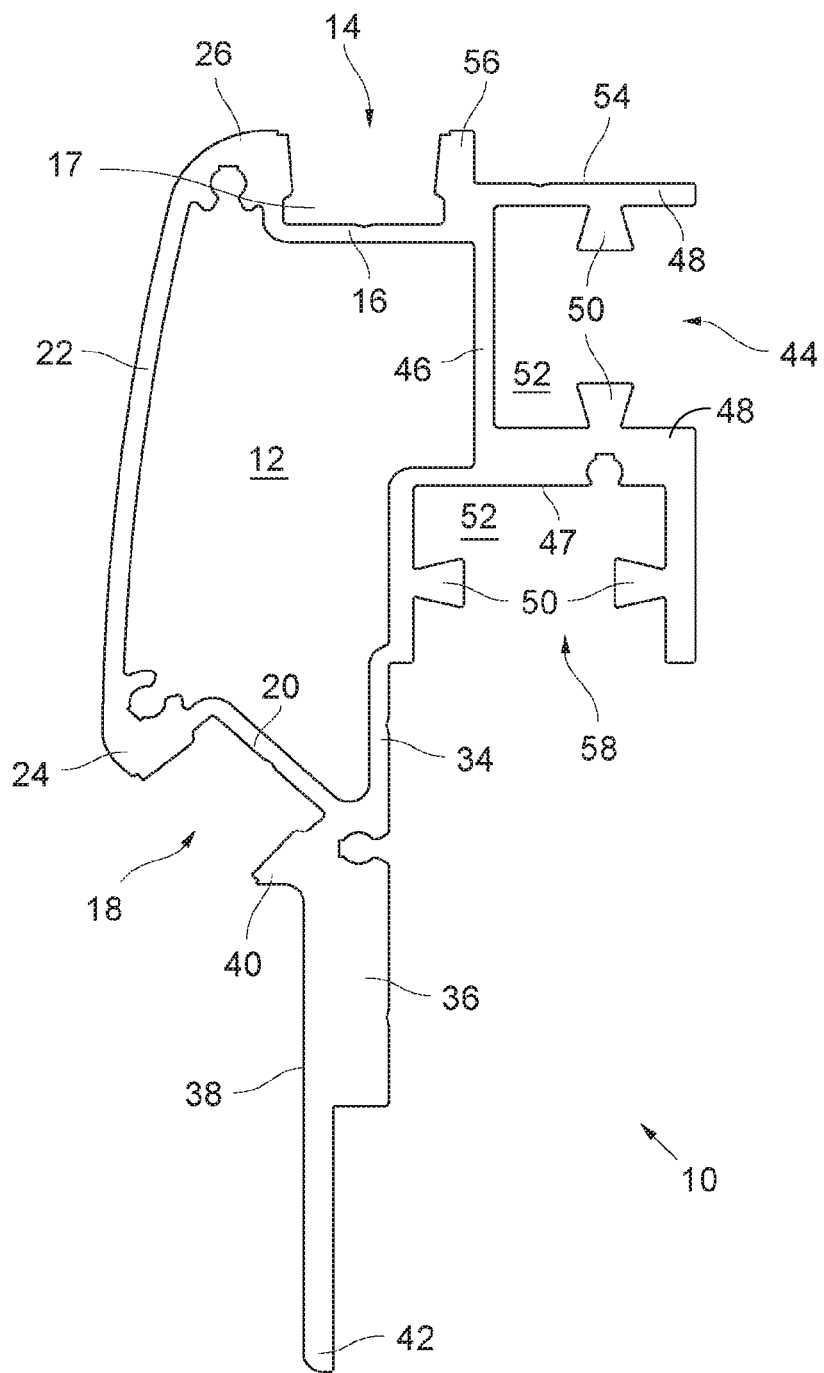
FIG. 1 is a cross section through one embodiment of an edge profile body according to the present invention.
Figure 2:
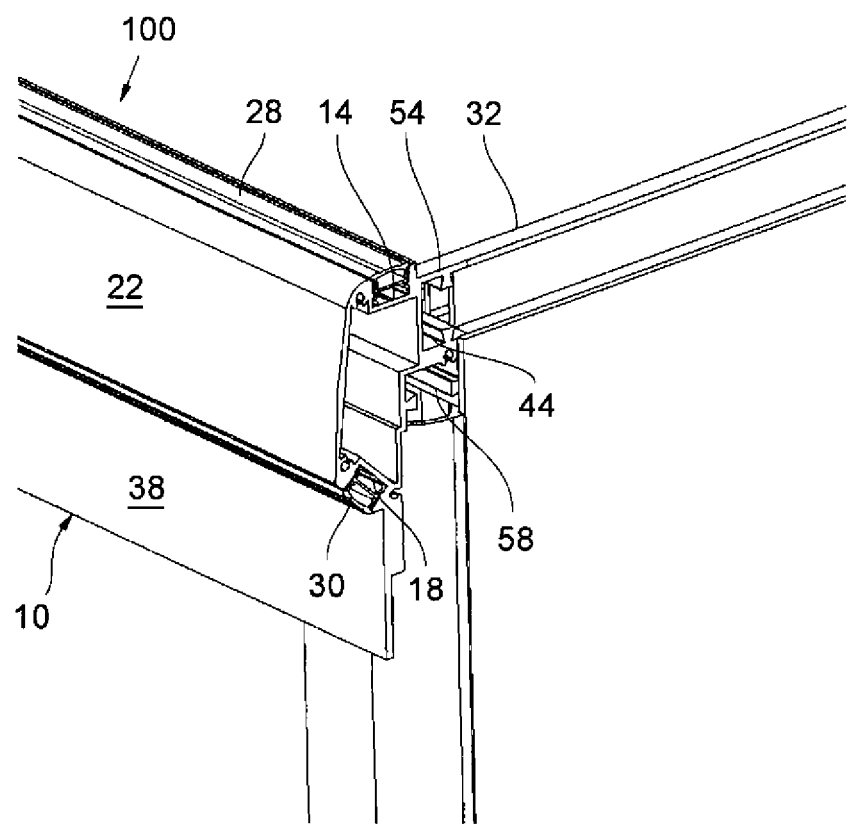
FIG. 2 is a perspective view of the edge profile comprising the edge profile body from FIG. 1 in its mounted position fixed to the superstructure of a vehicle body.

The profile body 10 in FIG. 1 is the main structure component of the edge profile 100 in FIG. 2 for bordering the superstructure of a rescue vehicle, in particular a fire fighting vehicle. The profile body 10 is an extruded profile formed of a metal like aluminum or an aluminum alloy. The cross section of this extruded profile body 10 comprises a central hollow channel 12 that is open only to the longitudinal ends of the profile body 10. In FIG. 1, the back side of the edge profile 100 (or the profile body 10) is located at the right side of the cross section in the figure, which is the side of the edge profile to be fixed at the vehicle body. In the following description the term "back" refers to the mounting position of the edge profile as such, its back side facing the vehicle, while the term "lateral" refers to one side of the cross section of the profile body 10, as seen in FIG. 1. This means that the back side and front side of the edge profile are each one of the lateral sides of the cross section in the perspective of FIG. 1.

On the top side of the profile body 10, its cross section comprises a first groove 14 opening towards the upper side of the profile body 10. This first groove 14 has a rectangular cross section, and the horizontal flat bottom 16 of this first groove 14 is defined by a horizontal wall portion that separates the space within the first groove 14 from the central hollow channel 12 inside the profile body 10. The walls of this groove 14 are slightly inclined towards each other so as to constrict the free cross section of the groove 14 towards its bottom 16. Directly above the bottom 16 of the groove 14, an undercut 17 is formed.

At a lateral bottom portion of the cross section of the profile body 10, a second groove 18 is located that has also a mainly rectangular cross section with a flat bottom 20 delimiting the space within the second groove 18 from the hollow channel 12. While the cross section and shape of both first and second grooves 14,18 is approximately the same, including the restricting free cross section of the second groove 18 and the undercut at its bottom 20, the bottom 20 of the second groove 18 is inclined about an angle of about 45 degrees with respect to the vertical axis. By this arrangement the cross section of the second groove 18 opens laterally downwards towards the bottom side of the profile body 10.

At the front side of the profile body 10, the hollow central channel 12 is closed by a front wall 22 connecting the front edge 24 of the second groove 18 with the front edge 26 of the first groove 14, this front wall 22 being slightly bended and having an approximately vertical cross section at its bottom portion.

Both first and second grooves 14,18 are provided to receive a band-shaped lighting device, like it is shown in FIG. 2. In the embodiment described here, this band-shaped lighting device is a lighting bar 28,30 that is fixed within the respective first or second groove 14,18. This lighting bar can be made of a transparent or translucent plastic material, with a number of light sources arranged within the lighting bar. Any electric supply means like a cable, can also be housed within the lighting bar 28,30 or within a space below the respective lighting bar 28,30 and the bottom 16,20 of the respective first or second groove 14,18. In the case of the first groove 14, the lighting bar 28 serves to illuminate the space above the edge profile 100 and to mark a borderline encircling the superstructure of the vehicle, especially a top plate 32 that forms a deck of the vehicle. A person standing on this deck 32 can easily identify the borders of the top plate, that are visualized by the first band-shaped lighting device in form of a lighting bar 28 received within the first groove 14.

A second lighting bar 30 forms a second band-shaped lighting device that is comprised within the second groove 18. The shape and cross section of this second lighting bar 30 may be the same as the first lighting bar 28, also comprising a number of light sources housed within the hollow second lighting bar 30. Because of the inclination of the second lighting bar 30 that is arranged within the second groove 18 opening laterally towards the bottom side of the profile body 10, the main radiation direction of the second lighting bar 30 is inclined downwardly in a direction away from the vehicle body for illuminating the ground area around the vehicle.

The back side of the hollow central channel 12 is formed by a back wall 34 that emerges into a vertical plate-shaped flange portion 36 protruding downwardly at the bottom of the extruded profile body 10. The flat front side 38 of this flange portion extends from the lower (inner) edge 40 of the second groove 18 towards the bottom end 42 of the profile body 10. This flat front surface 38 can serve as an area for applying a contour marking to improve the visibility of the superstructure of the vehicle. As an additional function, the flange portion 36 can cover the upper portion of a vehicle compartment for storing devices that are needed in a rescue situation. In particular the flange portion 36 may cover the top portion of an integrated roller shutter of such a compartment.

The top deck portion of the extruded profile body 10 further comprises a first cross section portion 44 that faces the vehicle body. This first cross section portion 44 comprises a mainly rectangular groove (also referred to as third groove) that opens towards the back of the profile body 10, wherein the bottom 46 of this third groove is formed by a vertical upper back wall portion of the central hollow channel 12. The walls 48 of this groove further comprise ridges 50 of a dovetail shape that protrude from these sidewalls 48. These ridges 50 extend in the longitudinal direction of the profile body 10 so that an undercut portion 52 is formed between the ridges 50 and bottom 46 of the groove of the first cross section portion 44. The shape of the first cross section portion 44 is such that it can engage with a corresponding fixing means at the vehicle body (not shown) for fixing the edge profile 10 to the vehicle body. For example, corresponding protrusions may extend in the longitudinal direction into the opposing open ends of the first cross section portion 44 to engage with the dovetail shaped ridges 50 or into the undercut portion 52 so as to prevent the edge profile 10 from being drawn off the vehicle body. The shape of the first cross section portion 44 can be such that it matches with fixing means of a modular system for constructing the superstructure of the rescue vehicle.

The top side of the upper sidewall portion 48 of the first cross section portion 44 forms a flat upper support portion 54 on top of the first cross section portion 44 for supporting the top plate 32 forming the deck of the superstructure, as shown in FIG. 2. This means that this wall portion 48 has the functions to delimit the first cross section portion 44 towards the top side of the profile body 10, on one hand, and to support the edge of the top plate 32 on the other hand. Towards the front side of the profile body 10, the flat upper support portion 54 is delimited by a ridge 56 separating the flat upper support portion 54 from the first groove 14.

Below the first cross section portion 44, a second cross section portion 58 is provided that has generally the same shape in cross section as the first cross section portion 44. This means that a second cross section portion 58 comprises a groove (also referred to as fourth groove) with a mainly rectangular shape, with a flat bottom 47 (which is arranged here at the top side of the second cross section portion 58) and vertical side wall portions 48 with ridges 50 that have a dovetail shape, forming an undercut 52 between the ridges 50 and the bottom 47 of the second cross section portion 58. The second cross section portion 58 is turned around 90° with respect to the first cross section portion 44 so that the fourth groove opens towards the bottom side of the profile body 10. The second cross section portion 58 is also provided for engaging with a fixing means (not shown) for fixing the edge profile 100 to the vehicle body, for example, a protrusion with a complementary shape engaging into the opposing open ends of the second cross section portion 48 so that it is possible to lift the edge profile 100 from its mounted position.

In the present embodiment the edge profile 100 according to the present invention combines different advantages, namely the integration of a lighting system for visualizing the borders of the top plate 32 forming the deck of the superstructure, the integration of a lighting system for illuminating the ground area around the vehicle, an area for applying a visual marking, and a closing structure for closing the top portion of a vehicle compartment below and behind the edge profile 100. Moreover, this edge profile 100 can easily be mounted as part of a modular system by means of a first and second cross section 44 and 58 for engaging with a corresponding fixing means of this system. Furthermore it is noted that the central hollow channel 12 can be used for guiding supply means like electrical cables or hydraulic hoses. The number of parts that is necessary for mounting the edge profile 100 is reduced, which also applies to the mounting costs.

What is claimed is:

1. An edge profile for bordering the superstructure of a vehicle, the edge profile having a cross-section comprising:
    a single central channel delimited by an upper wall, a lower wall, a front wall and a back wall extending between the upper wall and the lower wall,
    an upper light groove having an upper light groove inside edge, an upper light groove outside edge and a bottom wall constituting said upper wall of said central channel,
    a lower light groove having a lower light groove upper edge, a lower light groove lower edge and a bottom wall constituting said lower wall of said central channel,
wherein the front includes a single wall connecting the upper light groove outside edge and to the lower light groove upper edge,
wherein the upper light groove is configured to receive a light source for illuminating upwards from the edge profile, and wherein the lower light groove is configured to receive a light source for illuminating downward and away from the edge profile;
    a lower flange portion protruding downward from the lower light groove lower edge;
    a horizontal engagement groove for horizontally engaging the superstructure of the vehicle, the horizontal engagement groove being defined by an upper horizontal flange protruding from the upper light groove inside edge towards a back side of the edge profile, a lower horizontal flange protruding from the back wall towards the back side of the edge profile below said upper wall of said channel, and an upper portion of the back wall extending from the upper wall of the channel to said lower horizontal flange; and
    a vertical engagement groove for vertically engaging the superstructure of the vehicle, the vertical engagement groove being defined by a lower portion of the back wall portion extending below the lower horizontal flange, the lower horizontal flange and a vertical flange protruding downward from an end of the lower horizontal flange opposite to said lower portion of the back wall;
wherein the lower horizontal flange forms a wall delimiting both the horizontal engagement groove and the vertical engagements engagement groove.

2. The edge profile cross section of claim 1, wherein the horizontal engagement groove and the vertical engaging groove are configured to engage the superstructure of the vehicle via dovetail joints.

3. The edge profile cross section of claim 1, wherein the upper light groove and the lower light groove are configured to receive light sources via snap-fit action.

4. The edge profile cross section of claim 1, wherein the lower back wall portion and the vertical upper back wall portion are vertically offset in relation to one another.

5. The edge profile cross section of claim 1, wherein the central channel includes an upper portion defined by an upper portion of the front wall, the vertical upper back wall portion, and a bottom of the upper light groove.

6. The edge profile cross section of claim 5, wherein the horizontal engagement groove is proximate the upper portion of the central channel.

7. The edge profile cross section of claim 5, wherein the central channel further includes a lower portion defined by a lower portion of the front wall, the lower back wall portion, and a bottom of the lower light groove.

8. The edge profile cross section of claim 7, wherein the vertical engagement groove is proximate the lower portion of the central channel.

9. The edge profile cross section of claim 1, wherein the central channel is defined in part by a bottom side of the upper light groove.

10. The edge profile cross section of claim 1, wherein the central channel is defined in part by a bottom side of the lower light groove.

* * * * *